Jan. 28, 1958 G. W. CAMPBELL ET AL 2,821,057
GRASS EXTRACTOR FOR COTTON PICKING MACHINES
Filed March 29, 1957

INVENTORS
GEORGE W. CAMPBELL
& MINNIE Z. DesCHAMPS
BY
McMorrow, Berman & Davidson
ATTORNEYS United States Patent Office 2,821,057
Patented Jan. 28, 1958

2,821,057
GRASS EXTRACTOR FOR COTTON PICKING MACHINES

George W. Campbell, Lynchburg, and Minnie Z. Des Champs, Sumter, S. C.

Application March 29, 1957, Serial No. 649,515

5 Claims. (Cl. 56—28)

In the operation of cotton picking or stripping machines, it has been found that where there is an excess of grass growing amid the cotton plants, the cotton cannot be efficiently picked by machine because the grass will be picked therewith, and tends to twist within the lint in a manner such as to prevent removal of the grass.

In view of the above, it is proposed to provide a grass extractor for cotton picking machines so designed that when the divider or stalk lifter of the machine picks up the limbs of the plant, arms provided upon the grass extractor of the invention will slip under the limbs, will catch the grass, and will pull the grass back downwardly out of the picker so that the grass cannot pass through the picker.

Another object is to provide an extractor of the character described which will eliminate approximately 75 percent of the grass that would otherwise be picked with the cotton.

Another object is to so form the grass extractor that should one of the arms thereof be struck by a stalk of cotton, the arm will yield to permit the stalk to pass after which the arm will immediately be snapped back into place.

Another object is to provide a grass extractor for cotton picking machines which will not "hang" during operation, thus to permit one to operate the cotton picking machine at the normal rate of speed without requiring that the speed thereof be retarded.

Still another object is to so design the extractor as to permit it to be put upon or removed from the machine in a relatively short time and without the requirement of specially trained help.

Yet another object is to provide a grass extractor that will be designed, with relatively minor modifications, for mounting on any of various makes of cotton picking machines, without requiring any modification or redesign of said machines.

Other objects will appear from the following description, the claims appended thereto, and from the annexed drawing, in which like reference characters designate like parts throughout the several views, and wherein:

Figure 1:
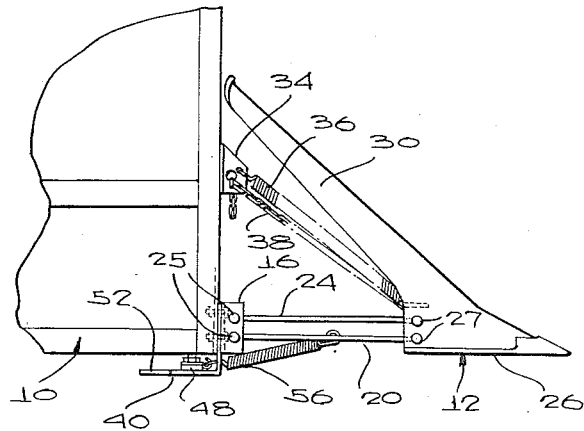
Figure 1 is a fragmentary side elevational view of the plant or stalk lifter of a cotton picking machine, with the invention attached.

Referring to the drawings in detail, designated generally at 10 is a plant lifter assembly of a cotton picking machine of well known design. The machine includes identical but oppositely formed plant lifting and guide mechanisms 12, 14 respectively including forwardly opening, vertically extending, channeled support brackets 16, 18 fixedly secured to the picker frame structure. Vertically swingable upon and projecting forwardly from the brackets are lower arms 20, 22 and upper arms 24, swinging about parallel, horizontal, transverse axes defined by pivot pins 25 to provide a parallelogram type linkage.

Horizontally disposed shoes 26, 28 are pivotally connected at 27 to the forward ends of the arms 20, 22, 24. Rigid with and inclining rearwardly upwardly from the shoes are shields 30, 32 respectively. Brackets 34 are vertically spaced upwardly from the brackets 16, 18, and connected to the brackets 34 are springs 36, these being contractile springs connected at their forward ends to the brackets 34. Limit chains 38 are connected between brackets 34 and the shoes, so as to limit downward swinging movement of the shoes with the arms 20, 22, 24. At the same time, springs 36 are adapted to exert a continuous, yielding upward pull on the shoes.

All this is conventional construction and does not per se constitute part of the present invention. As will be noted from Figure 2, the conventional construction further includes sets of guide and lifting fingers 39. These project laterally, rearwardly from the inner side surfaces of the shoes, so as to define a tapering throat into which the plants will be guided.

The device constituting the present invention is so designed as to be in actuality a pair of grass extracting devices of opposite but identical formation, one for each of the assemblies 12, 14 respectively. This will be readily noted from Figure 2, and as will be observed, the devices include outer right-angular or L-shaped brackets 40, 42 respectively adapted to be interposed between the brackets 16, 18 and the adjacent portion of the picker frame structure 10. In other words, the brackets 16, 18 are first removed after which the angular brackets 40, 42 are positioned, with openings 43 of the brackets 40, 42 being aligned with corresponding openings of the frame structure 10 and of the brackets 16, 18. On replacement of the mounting bolts, the brackets 40, 42 will be fixedly engaged in place.

Figure 2:
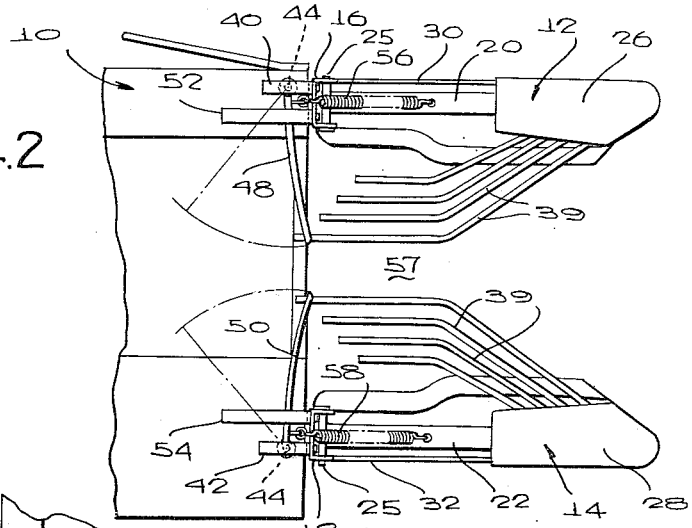
Figure 2 is a fragmentary bottom plan view of the plant lifting device and of the grass extractor.

Projecting upwardly from the horizontal leg of the brackets 40, 42 are studs 44, receiving eyes 46 formed on the inner ends of elongated, slightly longitudinally curved arms 48, 50 respectively which project toward each other transversely of the machine, and are curved slightly in a forward direction toward their free ends as shown in Figure 2, when in normal position.

The arms 48, 50 are thus swingable about vertical axis, in a common horizontal plane which is slightly below the horizontal, common plane of the fingers 39. The fingers 39, of course, are substantially in the plane of the guide shoes 26, 28.

Adjacent the respective, angular brackets 40, 42 there are larger angle brackets 52, 54 which are secured fixedly to the frame structure 10, to provide guides for the arms 48, 50. In other words, the inner end portions of the arms 48, 50 extend over and slidably contact the top surfaces of the rearwardly projecting, horizontal legs of the brackets 52, 54. As a result, when the arms 50 swing from their full line positions rearwardly as shown in dotted lines in Figure 2, they will be guided during their swinging movement by the brackets 52, 54.

Connected to the inner end portions of the respective grass extractor arms 48, 50 are contractile springs 56, the forward ends of which are hooked to the underside of the vertically swingable arms 20 of the stalk lifting assembly of the cotton picker.

The springs, tending to normally contract, pull the arms 48, 50 forwardly to their full line positions of Figure 2. In these positions of the arms, the tips thereof underlie the rear ends of the longest, innermost fingers 39 of the plant lifter assembly. The arms 48, 50 terminate at their free ends at opposite sides of but project slightly into the space 57 into which the cotton plant stalks are guided by fingers 39 during the forward movement of the device.

In operation, the extractor arms 48, 50 operate in such a manner that when the stalk lifter of the cotton picking machine picks up the limbs or branches of the plant, arms 48, 50 will slip under the plant branches, catching the grass to pull the grass back downwardly out of the picker unit. As a result, the grass does not pass through the picker device and it has been found in practice that this will eliminate about 75 percent of the grass that would otherwise be picked. In this way, the yield per acre of cotton is measurably increased, particularly in respect to acreage which in many cases is left unharvested due to the excessive amount of grass growing therein.

Figure 3:
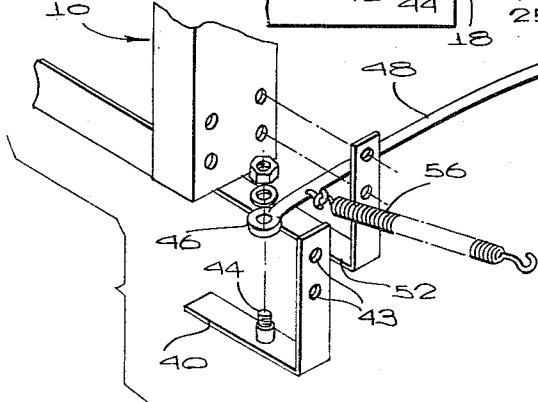
Figure 3 is an exploded perspective view of the extractor on an enlarged scale.

The device can of course be mounted on any of various well known makes of cotton picking machines. The construction illustrated and described is particularly adapted for mounting on McCormick or John Deere cotton pickers, both of the one or two row variety. If it is desired to mount the device on another make, as for example on an Allis-Chalmers machine, slight modifications would be made in the mounting brackets 40, 42 due to the fact that the openings for receiving the bracket-attaching bolts (see Figure 3) are horizontally spaced in this particular make of machine. In actuality, however, the principles of operation are retained without deviation from the construction hereinbefore illustrated and described.

An important characteristic of the invention resides in the fact that the arms 48, 50 are adapted to yield when obstructions are engaged that resist movement by the arms. In this case, the arms swing backwardly out of the way, without difficulty. At the same time, however, it is to be noted that the arms are always placed under a tension, by reason of the springs 56, such as to extract the major amount of the grass that grows adjacent the cotton, that would otherwise be picked up by the cotton picking machine. In practice, it has been found that about one-pound tension on the spring is adequate for this purpose.

Another important characteristic of the invention resides in the fact that the device can be installed on a cotton-picking machine with ease and speed, and without the requirement of specially trained help. Still further, modification or redesign of the conventional cotton picking machinery is not required. This makes the device valuable as an accessory, capable of being purchased at any time for attachment to the machines already in use.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a cotton picking machine of the type including elongated guide and lifting fingers grouped in transversely spaced sets and extending in a fore-and-aft direction within each set, a grass extractor attachment comprising a pair of identical but opposite arms extending toward each other and pivoted to swing between normal, first positions in which said arms extend approximately perpendicularly to the direction of movement of the machine and have free ends terminating at opposite sides of but projecting slightly into the space between said sets to pull grass away from stalks guided into said space, and second positions in which the arms are swung rearwardly out of said space; and resilient, yielding means tensioned to bias said arms to said normal positions thereof.

2. In a cotton picking machine of the type including elongated guide and lifting fingers grouped in transversely spaced sets and extending in a fore-and-aft direction within each set, a grass extractor attachment comprising a pair of identical but opposite arms extending toward each other and pivoted to swing between normal, first positions in which said arms extend approximately perpendicularly to the direction of movement of the machine and have free ends terminating at opposite sides of but projecting slightly into the space between said sets to pull grass away from stalks guided into said space, and second positions in which the arms are swung rearwardly out of said space; and resilient, yielding means tensioned to bias said arms to said normal positions thereof, said arms in the normal positions thereof having their free ends slightly leading in respect to the remainder of the arms, in the sense of direction of movement of the machine.

3. In a cotton picking machine of the type including elongated guide and lifting fingers grouped in transversely spaced sets and extending in a fore-and-aft direction within each set, the combination, with outermost fingers of the sets constituting those fingers immediately bounding said space, said outermost fingers having rear portions extending in parallel relation to each other at opposite sides of said space, of a grass extractor attachment comprising a pair of identical but opposite arms extending toward each other and pivoted to swing between normal, first positions in which the arms extend approximately perpendicularly to the direction of movement of the machine and have free ends terminating at opposite sides of but projecting slightly into the space between said sets to pull grass away from stalks guided into said space, said free ends of the arms intersecting said rear portions of the outermost fingers substantially at right angles thereto in said normal position of the arms, and second positions in which the arms are swung rearwardly out of said space; and resilient, yielding means tensioned to bias said arms to said normal positions thereof, said arms in the normal positions thereof having their free ends slightly leading in respect to the remainder of the arms, in the sense of direction of movement of the machine.

4. In a cotton picking machine of the type including elongated guide and lifting fingers grouped in transversely spaced sets and extending in a fore-and-aft direction within each set, the combination, with outermost fingers of the sets constituting those fingers immediately bounding said space, said outermost fingers having rear portions extending in parallel relation to each other at opposite sides of said space, of a grass extractor attachment comprising: a pair of identical but opposite arms extending toward each other and pivoted to swing between normal, first positions in which the arms extend approximately perpendicularly to the direction of movement of the machine and have free ends terminating at opposite sides of but projecting slightly into the space between said sets to pull grass away from stalks guided into said space, said free ends of the arms intersecting said rear portions of the outermost fingers substantially at right angles thereto in said normal position of the arms, and second positions in which the arms are swung rearwardly out of said space; a support bracket and a guide bracket for each arm, said support and guide brackets being of right-angular form and being fixedly connectable to the machine in positions such that one leg of the respective brackets extends horizontally, rearwardly, the brackets of each arm being closely, laterally spaced with each arm being pivoted on the support bracket and being guided in its swinging movement by the horizontal leg of the guide bracket; and resilient, yielding means tensioned to bias said arms to said normal positions thereof, said arms in the normal positions thereof having their free ends slightly leading in respect to the remainder of the arms, in the sense of direction of movement of the machine.

5. In a cotton picking machine of the type including elongated guide and lifting fingers grouped in transversely spaced sets and extending in a fore-and-aft direction within each set, the combination, with outermost fingers of the sets constituting those fingers immediately bounding said space, said outermost fingers having rear portions extending in parallel relation to each other at opposite sides of said space, of a grass extractor attachment comprising: a pair of identical but opposite arms extending toward each other and pivoted to swing between normal, first positions in which the arms extend approximately perpendicularly to the direction of movement of the machine and have free ends terminating at opposite sides of but projecting slightly into the space between said sets to pull grass away from stalks guided into said space, said free ends of the arms intersecting said rear portions of the outermost fingers substantially at right angles thereto in said normal position of the arms, and second positions in which the arms are swung rearwardly out of said space; a support bracket and a guide bracket for each arm, said support and guide brackets being of right-angular form and being fixedly connectable to the machine in positions such that one leg of the respective brackets extends horizontally, rearwardly, the brackets of each arm being closely, laterally spaced with each arm being pivoted on the support bracket and being guided in its swinging movement by the horizontal leg of the guide bracket; and resilient, yielding means tensioned to bias said arms to said normal positions thereof, said arms in the normal positions thereof having their free ends slightly leading in respect to the remainder of the arms, in the sense of direction of movement of the machine, each arm overlying the horizontal leg of its associated guide bracket and underlying its associated outermost finger of said sets of fingers.

References Cited in the file of this patent

UNITED STATES PATENTS

| | | |
|---|---|---|
| 515,031 | Turner | Feb. 20, 1894 |
| 685,111 | Dannelly | Oct. 22, 1901 |
| 685,443 | Campbell | Oct. 29, 1901 |
| 722,421 | Campbell | Mar. 10, 1903 |
| 1,713,398 | Rountree | May 14, 1929 |
| 1,801,996 | Benjamin | Apr. 21, 1931 |
| 2,025,514 | Johnston | Dec. 24, 1935 |
| 2,674,075 | Snow | Apr. 6, 1954 |
| 2,677,226 | Hyman | May 4, 1954 |
| 2,700,857 | Stearman | Feb. 1, 1955 |
| 2,731,780 | Witt | Jan. 24, 1956 |